(12) United States Patent
Smith

(10) Patent No.: US 11,520,836 B2
(45) Date of Patent: Dec. 6, 2022

(54) AUTOMATED PLATFORM FOR DATA MANAGEMENT

(71) Applicant: Brandy Smith, Colleyville, TX (US)

(72) Inventor: Brandy Smith, Colleyville, TX (US)

(73) Assignee: Brandy Smith, Colleyville, TX (US)

( * ) Notice: Subject to any disclaimer, the term of this patent is extended or adjusted under 35 U.S.C. 154(b) by 17 days.

(21) Appl. No.: 16/896,106

(22) Filed: Jun. 8, 2020

(65) Prior Publication Data

US 2020/0387544 A1 Dec. 10, 2020

Related U.S. Application Data

(60) Provisional application No. 62/858,098, filed on Jun. 6, 2019.

(51) Int. Cl.
*G06F 7/02* (2006.01)
*G06F 16/00* (2019.01)
*G06F 16/906* (2019.01)
*G06F 16/93* (2019.01)
*G06F 16/16* (2019.01)

(52) U.S. Cl.
CPC .......... *G06F 16/906* (2019.01); *G06F 16/164* (2019.01); *G06F 16/93* (2019.01)

(58) Field of Classification Search
CPC ...... G06F 16/906; G06F 16/93; G06F 16/164; G06F 16/00
See application file for complete search history.

(56) References Cited

U.S. PATENT DOCUMENTS

| | | | |
|---|---|---|---|
| 6,594,692 B1 * | 7/2003 | Reisman | G06F 8/65 709/219 |
| 10,866,865 B1 * | 12/2020 | Morkel | G06F 16/2379 |
| 11,107,158 B1 * | 8/2021 | Hu | G06Q 40/025 |
| 2015/0341212 A1 * | 11/2015 | Hsiao | H04L 67/75 715/735 |
| 2018/0275913 A1 * | 9/2018 | Mitkar | G06F 11/1469 |
| 2021/0383466 A1 * | 12/2021 | Hasegawa | G06Q 40/06 |

\* cited by examiner

*Primary Examiner* — Bruce M Moser
(74) *Attorney, Agent, or Firm* — Meunier Carlin & Curfman LLC

(57) ABSTRACT

An electronic record management system creates a streamlined full-service technology solution on a single electronic platform that has the capability to enable business transactions including but not limited to real estate transactions as well as buying and selling commercial debt and equity while optimizing performance. The automated platform utilizes artificial intelligence and machine learning to iteratively optimize consolidated electronic data files from multiple sources to allow sophisticated transactions involving commercial real estate, and other transferrable properties, electronically through a single platform.

5 Claims, 7 Drawing Sheets

AUTOMATED PLATFORM FOR DATA MANAGEMENT

CROSS REFERENCE TO RELATED APPLICATIONS

This application claims priority to and incorporates by reference U.S. Patent Application Ser. No. 62/858,098, filed on Jun. 6, 2019, and entitled Automated Platform for Data Management.

FIELD

This disclosure relates to the field of data file management, electronic records, and user interfaces for automated work processes that use the data in sophisticated and time sensitive commercial transactions.

BACKGROUND

Numerous commercial endeavors require access to large volumes of data in a searchable format within a platform that allows for data manipulation to achieve an end goal. Many applications require consolidation of data from many different sources, in different formats, stored across various protocols, and accessed via respective software types. This makes efficient use of data across institutional boundaries cumbersome and prone to error. Companies have a need to consolidate incoming files of many different types during events that happen in the corporate life span—such as mergers, acquisitions, and divestments—or when the company is beginning a new venture requiring fast and accurate user interfaces to data warehouses. The companies often farm-out data consolidation and customization processes, but the underlying problems remain even among the experts in data management.

Table 1 illustrates some of the problems faced by market participants in the area of data control protocols.

A need continues to exist in the fields of data management, data consolidation, and data uniformity for a global solution having a consistent and well-planned method of automated procedures for approaching problems inherent to electronic record transfer and consolidation into one platform when the data originates from multiple sources with no single protocol.

BRIEF SUMMARY OF THE DISCLOSURE

In one non-limiting embodiment, the platform described below is a document management system that utilizes a network of computers connected for data communication. A transmitting server delivers electronic records to a receiving server and at least one processor and computerized memory implement software configured to perform the following steps: (i) classify the electronic records by type; (ii) associate files with transactions and properties; (iii) apply standardized file names; (iv) extract data from files; (v) validate extracted data & resolve exceptions; (vi) use data and tapes and reports to authenticate data transfer.

TABLE 1

| Problem | Client | Vendor | Solution |
| --- | --- | --- | --- |
| Inefficient | Fragmented Process | Fragmented Systems<br>Time Consuming "Work Arounds" | One Stop Shop |
|  | Time Consuming | Effort Driven/Manual Process | Automated |
|  | Checking Vendor's Work Product | Time Consuming | layout what is automated |
|  | Learning Multiple Vendor Processes | Risk of Human Error | High Level? |
|  | Multiple Touchpoints | Cost of Human Capital |  |
|  | Lack of "real time", institutional quality, and prompt reporting | Lack of Centralized, Accurate tracking of Data and/or Reporting | Standardized |
|  | Constrained by "What we have always done" | Constrained by "What we have always done" |  |
| Data Integrity | Opportunity Cost<br>Ability to timely market deal | Effort Driven/Manual Process<br>Time Consuming<br>Risk of Human Error<br>Cost of Human Capital | Automated |
|  | Reputation w/Market<br>Pricing Risk<br>Rating Agency Haircut<br>Buy Back Due to Error in data<br>Price reduction due to error in data | Reputation w/Market | Reputation w/Market<br>Probability of Accuracy<br>due to automation |
| High Cost | Multiple Vendors<br>Staff to Manage Fragmented<br>Process Internal/External<br>Cost to Do Business<br>Vendor passing off cost to Client | Cost of Human Capital | Automated = Low Cost |

Figure 6:
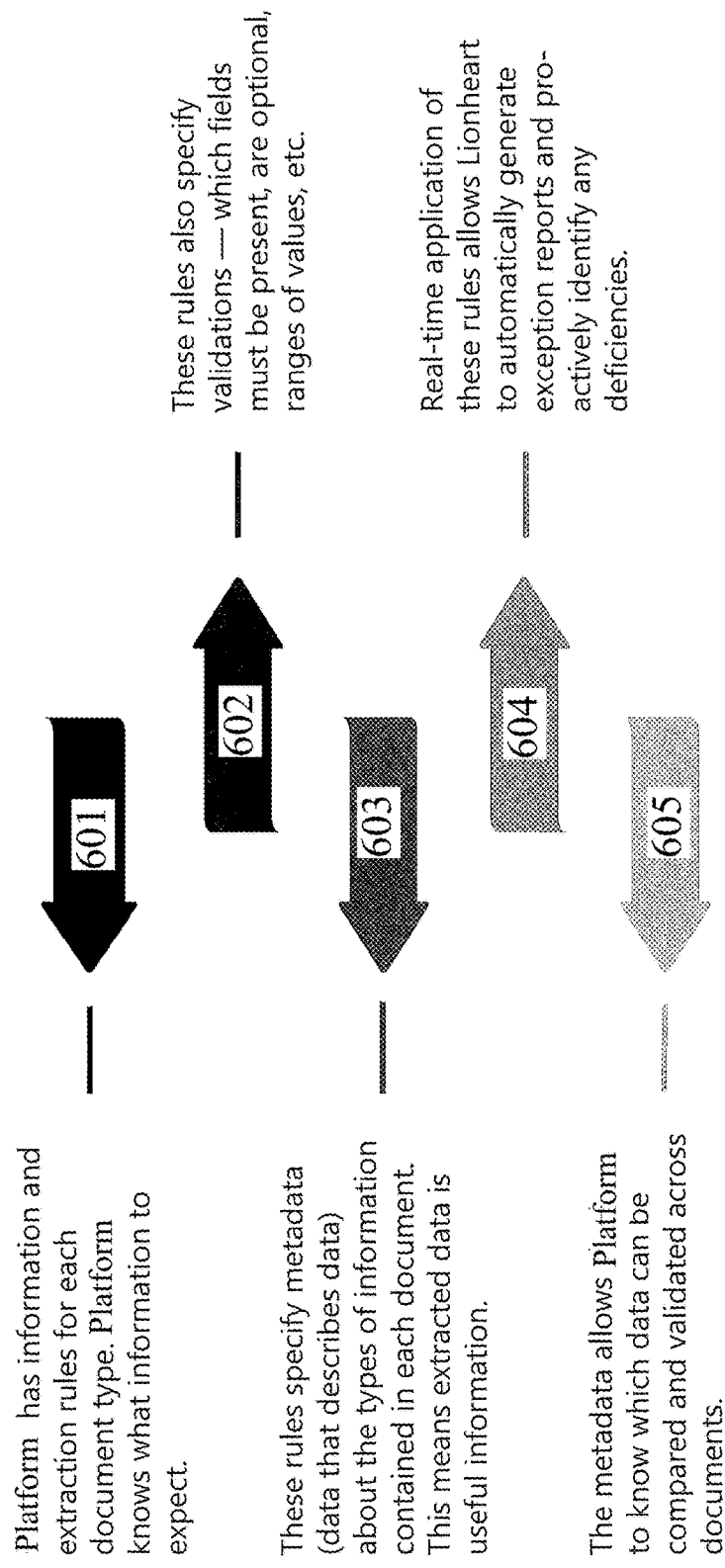

FIG. 6 is a schematic block diagram of steps used in creating exception reports utilized in a document management platform as set forth herein.

Figure 7:
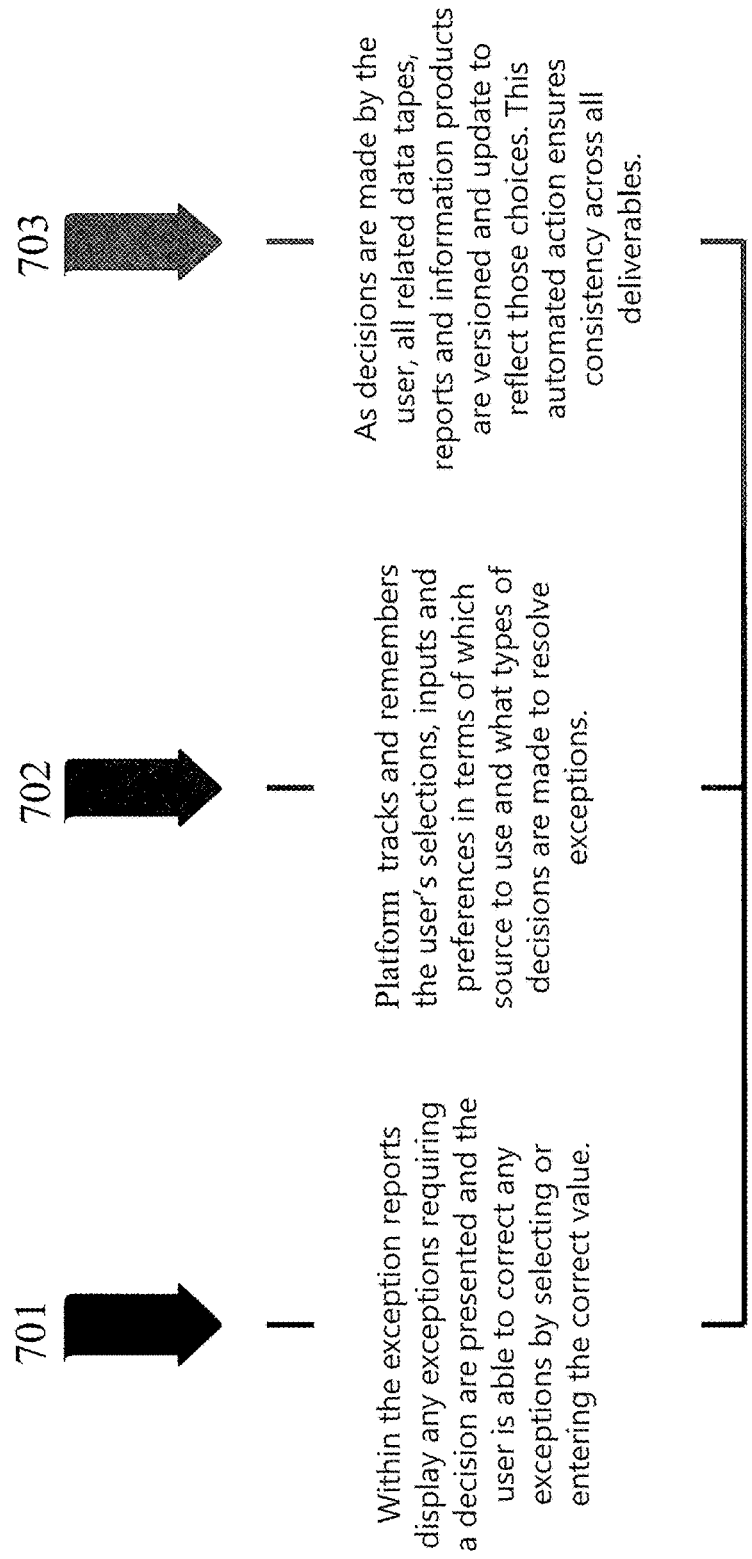

FIG. 7 is a schematic block diagram of steps used in creating exception reports utilized in a document management platform as set forth herein.

DETAILED DESCRIPTION

The following description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this invention belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a method includes a step is meant to include cases in which the method includes the step as well as cases in which the formulation does not include the step.

Publications cited herein are hereby specifically by reference in their entireties and at least for the material for which they are cited.

"Electronic devices" according to this disclosure are generally synonymous with all kinds of personal communications devices, including but not limited to smart phones, tablets, laptops, and computers of all kinds that are capable of transmitting communications data over networks (both wireless and traditionally wired).

The figures utilize an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

In its most basic configuration, a computing device typically includes at least one processing unit and memory. Depending on the exact configuration and type of computing device, memory may be volatile (such as random access memory (RAM)), non-volatile (such as read-only memory (ROM), flash memory, etc.), or some combination of the two.

Figure 2:
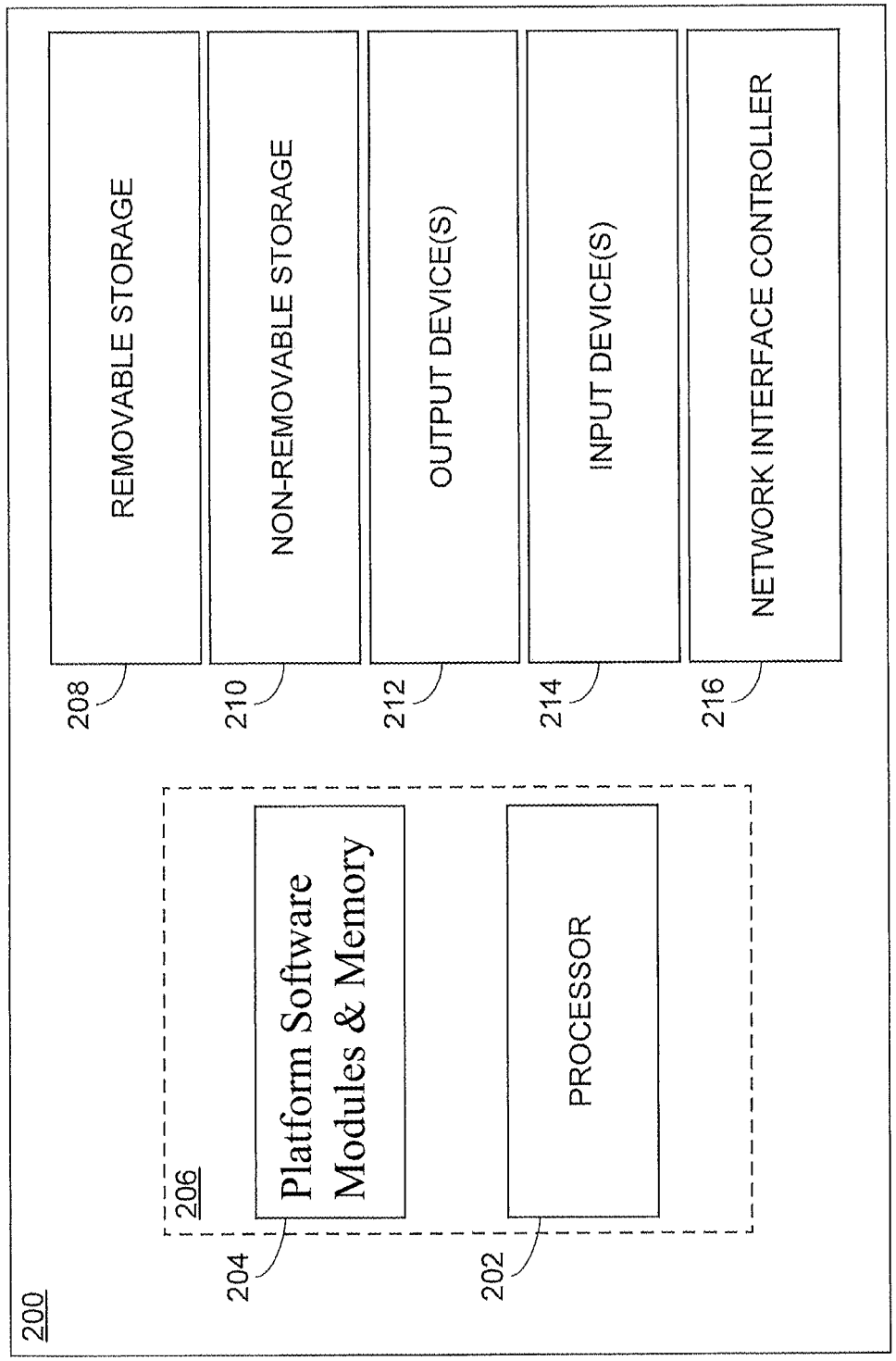
FIG. 2 is an overview diagram of a computer environment in which the steps utilized in a document management platform may be implemented as set forth herein.

Computing devices may have additional features/functionality. For example, computing device may include additional storage (removable and/or non-removable) including, but not limited to, magnetic or optical disks or tape. Such additional storage is illustrated in FIG. 2 by removable storage and non-removable storage.

A computing device typically includes a variety of computer readable media. Computer readable media can be any available media that can be accessed by the device and includes both volatile and non-volatile media, removable and non-removable media.

Computer storage media include volatile and non-volatile, and removable and non-removable media implemented in any method or technology for storage of information such as computer readable instructions, data structures, program modules or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device. Any such computer storage media may be part of computing device.

Computing device 200 may contain communication connection(s) that allow the device to communicate with other devices. Computing device may also have input device(s) such as a keyboard, mouse, pen, voice input device, touch input device, etc. Output device(s) such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as CD-ROMs, hard drives, or any other machine-readable storage medium where, when the program code is loaded into and executed by a machine, such as a computer, the machine becomes an apparatus for practicing the presently disclosed subject matter.

FIG. 2 illustrates a schematic flow of signals and/or data between various components of computerized systems that transfer data between source devices and recipient devices, according to various implementations described herein. In particular, the embodiments of this disclosure may utilize any kind of computer operations capable of network connection and including accessories such as human machine interface systems (e.g., touch pad(s), touch sensitive areas on a display, and/or switches for interfacing with one or more components on a data communications network handling user communication. Etc. These systems may be in communication with other processors disposed outside of the processors 202a and/or 202b. Furthermore, as noted above, the processor 202a or processor 202b may be further configured for controlling attached devices via input and output connections. Or in other implementations as depicted by the dotted lines, a separate processor may be disposed in each system. Furthermore, signals and/or data from the processors 202a, 202b or other processors may be communicated to receiver side processing units, such as the processing unit(s) that facilitate a data management system for electronic records and capabilities for further analysis and/or processing as set forth herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Figure 1:
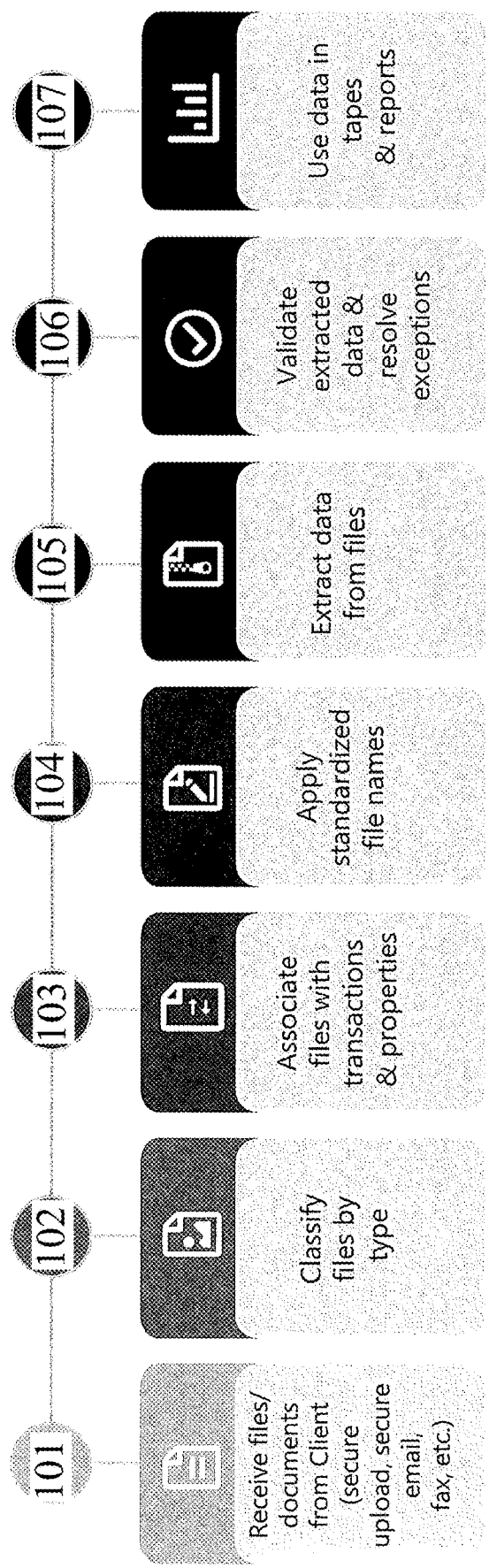
FIG. 1 is a schematic block diagram of steps utilized in a document management platform as set forth herein.

As noted above, numerous business endeavors require a consolidated data store for operations. FIG. 1 illustrates certain broadly designated steps in a computerized method for implementing an automated system disclosed herein. In one non-limiting embodiment, The basic data flow for one embodiment of this disclosure is set forth in the steps of FIG. 1. The steps are self-evident in FIG. 1, but key components are established to illustrate concepts in handling large transfers of data files and normalization practices allowing use of the data.

The noted steps may be implemented in the above described computerized systems of FIG. 2, as set forth above, which is just one example of computer components that may be useful in implementing a data management system. Many of these components will be used in duplicate across networks allowing data communications to and from large servers or even hand-held electronic devices. The key is to use automation opportunities to make the transferring, normalizing, and customizing of data easily manageable in a well-documented work-flow. The workflow may be implemented as a server based workflow such as a web server application. In one embodiment, the platform 204 is configured for file and document collection, solicitation, and capture. In this regard, the platform may be considered an electronic hub to which multiple parties can deliver information and from which all parties can see, collaborate, and store or retrieve data. The platform may be useful to perform, among other duties, the following steps:

(1) Continual automated data cleansing and comforting by comparing data points within documents and prioritizing/selecting the "best" and most "current" information for use.

(2) Automated exception reporting including resolution and reconciliation in addition to work flows to resolve errors, missing documents, and invalid content.

(3) Complete histories for detailed change tracking, source association, and variances in time and across source materials.

Figure 3:
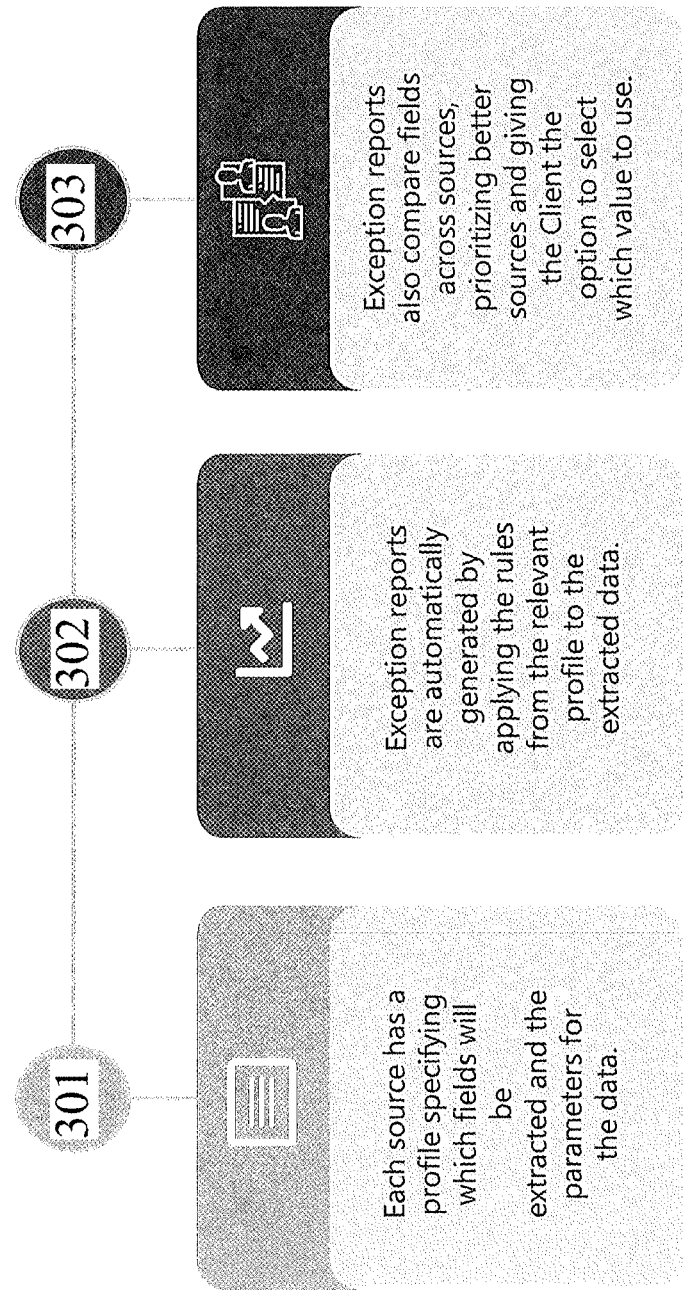
FIG. 3 is a schematic block diagram of steps utilized in standardizing data, data files, and documents in a document management platform as set forth herein.

FIG. 3 brings up one step that is unavoidable and yet often unmanaged in traditional data systems, the exception reporting. Even the most artfully crafted data transfer from one organization to another will have problem data sets, in whatever format the files exist. As shown in FIG. 3, the automated procedure of this disclosure allows for a convenient reporting procedure for reporting these exception data files that are difficult to transition to a new repository or a new platform. As shown in FIG. 3, one way to handle the exceptions is by anticipating the kinds of problems that a particular source of data files presents. In this way, each source of data being transferred can be profiled 301 to specify, in a computerized and automated procedure, which fields of data may be extracted successfully and the parameters for the data. This step may be subject to machine learning techniques that allow automated artificial intelligence routines to be programmed to understand the kinds of exceptions that particular profile will likely present and adjust the data transfer protocol accordingly. In this way, exception reports are generated 302, 303 automatically by applying previously coded or learned rules from a relevant profile for a particular data source.

Figure 4:
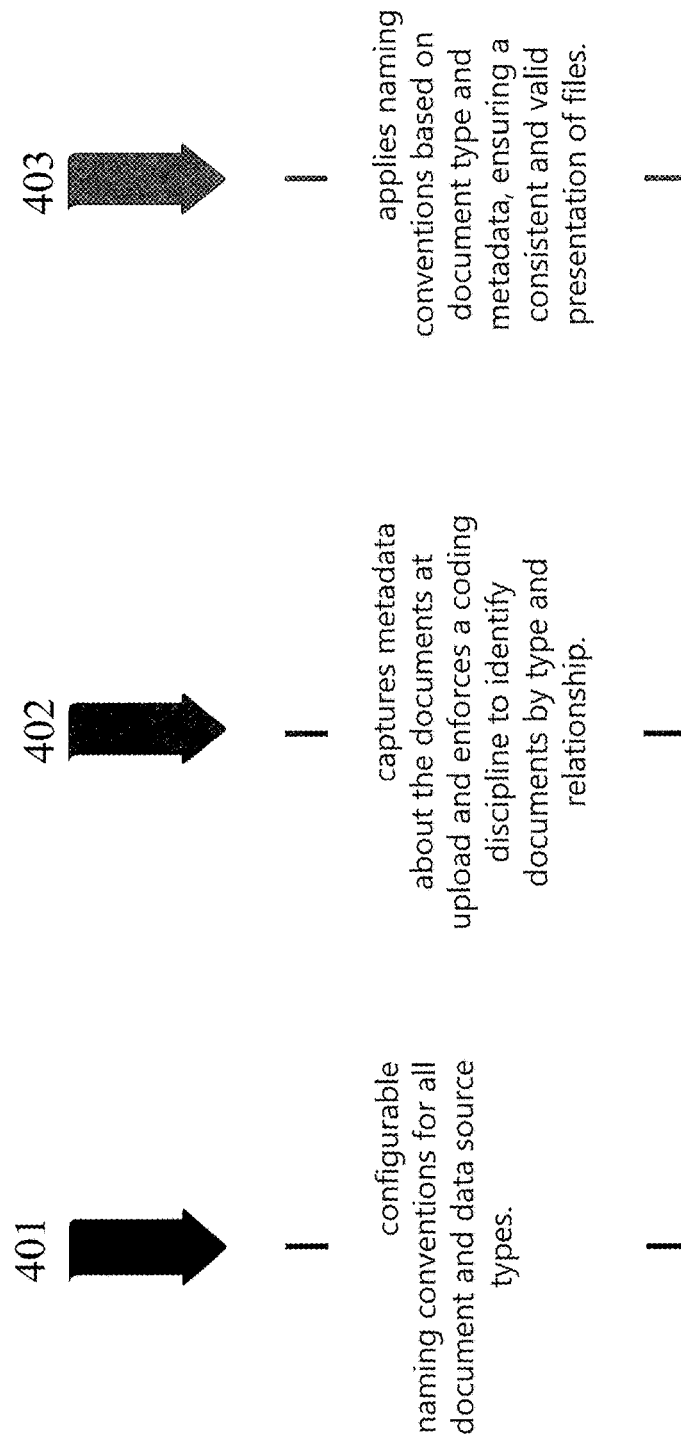
FIG. 4 is a schematic block diagram of naming standardization steps utilized in a document management platform as set forth herein.

FIG. 4 attached here illustrates three different kinds of automated systems that are possible according to this disclosure. In an initial implementation, a web-based application allows for file and data storage in computerized memory after receiving the data via a secure upload, validating the origin of the data, and accepting delivery of all of the data at hand. This implementation is discussed further in the pages to follow, but generally includes the steps of FIG. 4 to allow for a contextual analysis of the data, implementing the appropriate set of data management protocols/work flows, and implementing data storage (e.g., data tapes) as part of a due diligence project for the received data. In one non-limiting use of the data, a solidly secure and verified data store can be used for particular business endeavors such as but not limited to real estate deals utilizing an auction platform and self-listing of real estate. FIG. 4 also shows other embodiments that can take advantage of this disclosure, such as capital service markets for specialized transactions in finance or real estate lending, or even a full brokerage having detailed master services agreements with participants who utilize the technology platform described here via specialized user interfaces.

Certain goals of this automated platform, which may be described as a consolidation of computer programmed modules, include attributes of the platform by which users have access to notable functions:

1. Many contributors, many workers and many viewers can all simultaneously work in the platform.
2. New information, validation rules, edits and reconciliation results are instantly pushed from a server platform of this disclosure to reports and data outputs generated at client devices.

3. Detailed action logs, work tracking, notifications and alerts, and auditability of records is pre-planned and formatted for the activities of this platform.
4. This platform allows client devices to save time while simultaneously reducing errors, risk and exposure with an integrated and collaborative solution.

Figure 5:
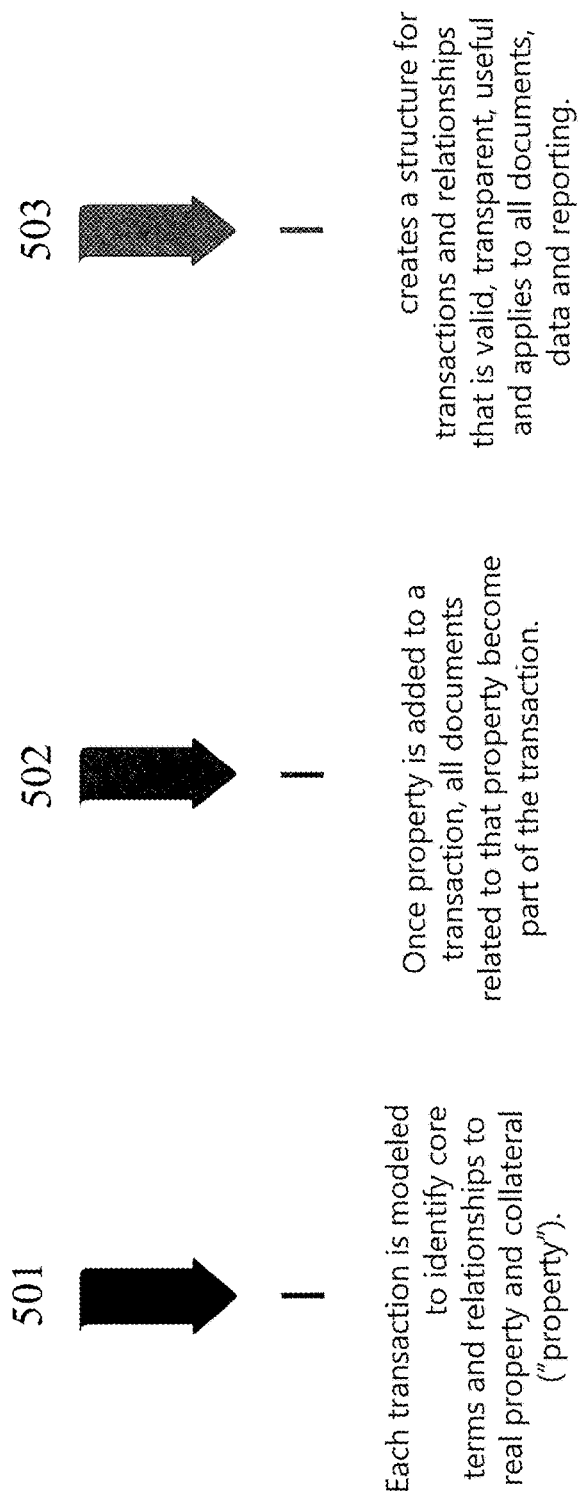
FIG. 5 is a schematic block diagram of steps to correlate documents utilized in a document management platform as set forth herein.

Implementing functions 1-4 incorporates significant steps in realizing the benefits of an automated data management platform as set forth herein, including but not limited to file name standardization (FIG. 4), associating documents with a transaction (FIG. 5), and execution of automated exception reports for data files that are not amenable to automated transfer (FIGS. 6-7).

In one non-limiting embodiment, implementing these features will involve leveraging both custom and open source software and commercial libraries for software and applications that can help identify and normalize certain data features such as file formats. Certain file formats for data consolidation will require work beyond standard template-based data entry and data parsing procedures. The platform of this disclosure can use cloud-based machine learning functions to accomplish certain goals in dealing with file formats and resolving exceptions when combining data stores into one common platform. Machine learning implementations include, but are not limited to, such procedures as using cloud-based Machine Learning functions as follows:

1. Big cloud platforms include machine language, which can be used use for speed;
2. Collect standard documents into a separate data repository for easy data resolution;
3. Train a platform model for each validation and categorization and extract data by developing application features to support ongoing model refinement;
4. Train a platform model with the assumption that models will not automatically give "the answer" in every case;
5. Build requirement sets to describe how models combine to provide the best data set that is statistically within a preferred margin of error.

Example machine learning features allow for significant assistance in automated procedures to code incoming data from multiple sources. These features include but are not limited to artificial intelligence routines that:

1. Determine how many signatures are on a document, if any;
2. Determine whether a document has been notarized;
3. Determine what kind of document is being examined;
4. Extract the purchase price from a document;
5. Group similar documents and identify the most recent version.

Many of these features may be implemented in a consolidated network of servers and specialized computers to accomplish the following:

1. OCR (Optical Character Recognition);
2. Upload Documents (for example, but not limited to, Client/Brokers);
3. Download documents/Read Only (for example, but not limited to Investor Disclosures);
4. Reporting;
5. Ability to know which docs are being viewed and how long; (including but not limited to how many times an investor entered the vault);
6. View/Print Options;
7. Watermark IP address on docs when printed;
8. Expiration of documents once a programmed module is complete (for example, but not limited to a completion routine indicating, with a data transmission, that an auction is over).

In one non-limiting application of this disclosure, and as noted in at least one embodiment described above, the computerized method, system, and digital application may be implemented to include an Auction Platform and a Traditional Platform allowing Self Service for commercial transactions (e.g., real estate) that can provide:

1. Abilities to negotiate legal documents online with redline and clean copies
2. Dashboards to view and print (activity of the deals, marketing plans pulled by Customer using a client device and/or Broker with either a client device or a direct connection to the server housing the platform disclosed herein)
3. Ability for Service Providers to use as a repository for their underwriting (negotiate terms for the use of data);
4. Build Buyer/Customer Database
5. Profile Buyers/Customers
6. Track property type, value band, state, metropolitan statistical area, occupancy, etc.

In other embodiments, the system and method include options for providing user interfaces for individuals and corporate employees that visit the website or try the products and then allow qualified stake holders to use the consolidated data stores described above to:

1. Query investors that meet certain criteria based on property
2. Monitor behavior—who responded on the website and who did not respond
3. Build out database of buyers—Buy lists, build out by who is on the site 501, 502
4. Data Cleansing
5. Ensure data is up to date 503
6. Entity mapping—uncover the buried relationships between users of client devices connected to a server application and leverage those connections for communications purposes.
7. Deduplication—names spelled differently and contact move from one company to another (false positives/D&B)
8. Establish relationship hierarchy (Blackstone/EDP, SPEs and DBAs).

In one non-limiting application of the platform described herein, data consolidation can be used to implement sophisticated real estate, financial, and other business transactions. In a real estate context, for example and without limiting the disclosure, the procedures of the automated data management platform can be implemented in stages as follows:

Example Overview of Real Estate Implementation V1
Stage 1a (**)—Procurement
Stage 1b (**)—Contracts (i.e. legal negotiations)
Stage 2—Due Diligence (***)

**Stage 1a & 1b will only occur once at onset of partnership between Lionheart and Client
***Multiple stages in Stage 2 can occur at one time. System can identify by workflow, who is working, how long, etc.

Stage 2a—Valuation (Gathering of initial documents, using valuation modeling to determine feasibility of transaction)
Stage 2b—Document retrieval (gathering of all required documents)
Stage 2c—Data Tape & Exception Reporting (Data integrity scoring & affirmation, electronic signature of Client required to finalize the data tape)

Stage 2d—Deal Dashboard (Assimilation of dashboard, including Asset Summary Report (ASR), Photography, Electronic signature of Client to move forward to stage 3)

Stage 3—Marketing (Deal(s) live, i.e. meaning deals being viewed by 3rd party)

Stage 4a—Bid (All services, including auction have this stage)

Stage 4b—Contract Negotiations (between Client, Investor, and respective legal counsel)

Stage 5—Closing (In Process)

Stage 6—Closed.

Breakdown V1

Stage 2b—Document retrieval (gathering of all required documents)

Stage 2c—Data Tape & Exception Reporting (Data integrity scoring & affirmation, electronic signature of Client required to finalize the data tape)

Version 1: Due Diligence Automation and Data Integrity

I. Due Diligence Automation

Data extraction 105, naming conventions 104, and file inventory are automated by a server platform 204 disclosed herein to identify and analyze data from documents with continual machine learning.

Document Processing provides hardware, software and methods to capture documents 101 via either direct connection uploading to memory in a server or by connecting and receiving documents via another application, such as email. This step may also require synchronization procedures to incorporate updates from changes a user makes on a local drive that is connected.

Classifying documents 102 may include software programmed at the server and as a module within the platform 204 to assign a category to sets of data, such as content from uploaded documents, based on facts of the documents (e.g., character count, blank lines, document type, source, and the like).

Assessment of the documents (autonomous function of the server platform validating documents). The platform of this disclosure and the separate modules of the platform may be programmed with standards, scoring modules, and the like to create a standard of validity 106 of a document or any other data set. In assessing a document or other data set for validity, the platform of this disclosure may score the data by assessing data features such as, but not limited to, analyzing metadata 402 and having an ability to determine an order of a set of documents from latest to most recent, track iterations of changes in data; replicate a numerical order of documents, ability to order the documents or data sets by dates of documents, whether a document is executed, or whether portions of a data set or a document that one would expect to see is missing (e.g., a missing page number). These kinds of data features, whether identified in metadata transmitted with a data set or directly extracted from a data set/document, may be assessed, or scored, with a computer implemented software method, to assess the validity of the data set or a portion of a data set at the server. In an automated scoring system, the platform assigns numeric values to the quality of each data set as compared to a test data set which may be created for automated machine learning.

In one example embodiment, the platform may include coding portions of data or individual documents by making an association between the document and any other assets that the server system implementing the platform has access to for use on the platform. For example, document sets such as groups of documents or even individual documents may be coded to indicate, for machine learning or human evaluation, what is the document related to and how a document is associated with a particular transaction or asset. 601-603. Standardizing naming convention for documents saved on a server for further processing may include at least one of the following:

(i) Automated standardization of document naming convention based on classifying, assessing, and validating the documents (ii) Conforming category standard of the naming convention for front-end use at document access, saving or data set retrieval (iii) Set and configure naming convention 401 based on server back-end work on the same page Sharing of the documents according to set standards that may be programmed as a sharing module that is part of the overall platform disclosed herein. The standards for sharing a document or a data set may include, but are not limited to, determinations (or programmed settings) showing that a document, a data set or a file is complete, a list of authorized recipients, (e.g., share file with buyer, seller); records of copyrights or data ownership; settings for approved ways to deliver data. The above noted sections may use a platform dashboard, implemented in a graphical user interface to establish tools, keys, touch screens and the like to implement analysis of data, tools to create, edit, and annotate data, and general access tools on the platform. The graphical user interface may allow for data entry for routing documents, gaining approvals in documents, implementing workflows—internal and external, approval & routing, and execution.

The platform is exceptionally adapted to locate and record sourcing of data, data files, and documents. The platform may include programming that establishes fields of data in a data repository (such as a database) to document or file relationships among portions of a data file. This sourcing information can be tracked for all of the sources ever accessed to receive data, data files, and documents in order to maintain accurate programming regarding expected profiles of a respective source's data formatting. This technique of establishing source, and therefore recipient, data profiles 601-605. that track formatting expectations for different users allows for a way to marry the data transferred between entities, format the data according to an appropriate and previously known profile for a source or recipient, and use source, recipient, lineage, and transmission protocols to keep the data in an effective format before and after transmission to outside parties. These kinds of data features, formatting protocols, transmission protocols and the like can also be incorporated into storage mechanisms such as data tapes 107 or other hardware for computerize memory.

Data Extraction

The platform 204 of this disclosure incorporates tools such as data extraction, which can be accomplished with meta data review or by disassembling documents and extracting all data. Data collection from each document goes into a respective data set;

In notable embodiments, a suite of automated technology solutions enable numerous commercial endeavors including but not limited to:

(i) ability to sell real estate online and by traditional methods that use online tools;

(ii) online auction platforms;

(iii) online sealed indicative/best and final offers;

(iv) ability to sell one-off and portfolio transactions;

(v) ability for 3rd parties to self-list transactions;

(vi) capability for CMBS Servicers to utilize custom database portal for underwriting;

(vii) valuation Services;

These and other aspects of a document management system as set forth herein are illustrated in the claim below and the attached figures.

What is claimed is:

1. A document management system, comprising:
   a network of computers connected for data communication;
   a transmitting server delivering electronic records to a receiving server, wherein the electronic records are associated with a transaction and originate from multiple sources;
   at least one processor and computerized memory implementing software configured to perform the following steps to consolidate data from the electronic records:
   (i) capturing metadata about the electronic records at upload to the receiving server;
   (ii) using the metadata to assign a document type to the respective electronic records according to the metadata and a respective source of the electronic records;
   (iii) applying standardized file names to the electronic records according to each type and the metadata;
   (iv) extracting data from the electronic records according to rules for each document type;
   (v) identifying respective data from the multiple sources that can be compared across the electronic records;
   (vi) comparing the respective data and selecting the respective data that is the most current data;
   (vii) assembling selected data as a respective data set;
   (viii) validating the selected data and resolving exceptions in the respective data set.

2. The document management system of claim 1, wherein assigning the document type comprises evaluating facts about the electronic records, and the facts that are evaluated comprise at least one of character count, blank lines, the metadata, signatures from execution, or presence of notarization.

3. The document management system of claim 1, further comprising machine learning programs that utilize the electronic records to identify a kind of document represented by the electronic records.

4. The document management system of claim 3, wherein the kind of document is selected from the group consisting of a real estate document, a loan document, a brokerage agreement document, an auction document, and a business transaction document.

5. The document management system of claim 4, wherein resolving exceptions comprises using the kind of document and a source profile to search the electronic records for identified fields that must be present and generate reports for missing fields.

* * * * *